(12) United States Patent
Koroly

(10) Patent No.: US 9,708,930 B2
(45) Date of Patent: Jul. 18, 2017

(54) MULTI-DEGREE OF FREEDOM ACOUSTIC PANEL

(71) Applicant: Rohr, Inc., Chula Vista, CA (US)

(72) Inventor: Christopher C. Koroly, Spring Valley, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 14/964,086

(22) Filed: Dec. 9, 2015

(65) Prior Publication Data

US 2017/0167291 A1    Jun. 15, 2017

(51) Int. Cl.
| *F01D 25/04* | (2006.01) |
| *F01D 25/24* | (2006.01) |
| *B64C 1/40* | (2006.01) |

(52) U.S. Cl.
CPC ............... *F01D 25/04* (2013.01); *B64C 1/40* (2013.01); *F01D 25/24* (2013.01); *F05D 2220/323* (2013.01); *F05D 2250/283* (2013.01); *F05D 2260/96* (2013.01)

(58) Field of Classification Search
CPC ............ F01D 25/04; F01D 25/24; B64C 1/40
USPC .................................................. 181/292, 290
See application file for complete search history.

(56) References Cited

U.S. PATENT DOCUMENTS

| 3,734,234 | A |   | 5/1973  | Wirt |                      |
|-----------|---|---|---------|------|----------------------|
| 3,821,999 | A | * | 7/1974  | Guess | .................. G10K 11/172 181/296 |
| 3,913,702 | A | * | 10/1975 | Wirt | ....................... B64D 33/06 181/286 |
| 4,257,998 | A |   | 3/1981  | Diepenbrock, Jr. et al. |         |
| 4,298,090 | A | * | 11/1981 | Chapman | .................. F02C 7/24 181/286 |
| 5,041,323 | A | * | 8/1991  | Rose | ......................... B32B 3/12 181/292 |
| 5,923,003 | A | * | 7/1999  | Arcas | ..................... B64C 21/04 181/213 |
| 5,997,985 | A | * | 12/1999 | Clarke | ..................... B32B 3/12 181/286 |
| 6,085,865 | A | * | 7/2000  | Delverdier | ............... B32B 3/12 181/286 |
| 7,434,659 | B2 | * | 10/2008 | Ayle | ....................... F02C 7/045 181/284 |
| 8,028,797 | B2 |   | 10/2011 | Douglas |                   |
| 8,047,329 | B1 |   | 11/2011 | Douglas et al. |             |
| 8,235,171 | B2 | * | 8/2012  | Douglas | ............... G10K 11/172 181/292 |
| 8,397,865 | B2 |   | 3/2013  | Douglas et al. |             |

(Continued)

FOREIGN PATENT DOCUMENTS

GB          2252075 A        7/1992

*Primary Examiner* — Forrest M Phillips
(74) *Attorney, Agent, or Firm* — O'Shea Getz P.C.

(57) ABSTRACT

A panel is provided for attenuating noise. This panel includes a first skin, a second skin and a cellular core. The cellular core may be connected to and form a plurality of cavities between the first skin and the second skin. The cellular core may include a wall and a septum. The cavities may include a first cavity and a second cavity. The septum may fluidly divide the first cavity into a first sub-cavity and a second sub-cavity. One or more perforations in the first skin may be fluidly coupled with the first sub-cavity. One or more perforations in the wall may fluidly couple the first sub-cavity with at least a region of the second cavity.

20 Claims, 5 Drawing Sheets

(56) References Cited

U.S. PATENT DOCUMENTS

| | | | |
|---|---|---|---|
| 2007/0272483 A1* | 11/2007 | Morin | F02C 7/045 181/292 |
| 2012/0168248 A1* | 7/2012 | Burak | F01D 25/162 181/292 |
| 2013/0251510 A1 | 9/2013 | Runyan et al. | |
| 2013/0299274 A1* | 11/2013 | Ayle | G10K 11/172 181/292 |
| 2015/0041248 A1* | 2/2015 | Ichihashi | E04B 1/84 181/292 |
| 2015/0110603 A1 | 4/2015 | Biset et al. | |

* cited by examiner

MULTI-DEGREE OF FREEDOM ACOUSTIC PANEL

BACKGROUND OF THE INVENTION

1. Technical Field

This disclosure relates generally to an acoustic panel and, more particularly, to an acoustic panel for attenuating noise in, for example, a gas turbine engine.

2. Background Information

A gas turbine engine may include an acoustic panel for attenuating noise generated during engine operation. A typical acoustic panel includes a honeycomb core connected between a solid face skin and a perforated face skin. This honeycomb core includes a plurality of resonating cavities. The honeycomb core may have a thickness that tunes the resonating cavities to a specific target frequency of the noise to be attenuated. As a result, noise waves reflected by the acoustic panel may interact with noise waves traveling towards the panel. Differences in phase between the noise waves in an acoustic field adjacent the perforated face sheet may enable the reflected noise waves to destructively interfere with and attenuate the noise waves traveling towards the acoustic panel.

New engine designs may require acoustic panels to attenuate noise with relatively low frequencies while utilizing substantially the same or less space than previous panels. Attenuating low frequencies, however, may increase the thickness of the honeycomb core and, thus, the thickness of the acoustic panel. There is a need in the art therefore for an improved noise attenuating acoustic panel.

SUMMARY OF THE DISCLOSURE

According to an aspect of the present disclosure, a panel is provided for attenuating noise. This panel includes a first skin, a second skin and a cellular core, which is connected to and forms a plurality of cavities between the first skin and the second skin. The cellular core includes a wall and a septum. The cavities include a first cavity and a second cavity. The septum fluidly divides the first cavity into a first sub-cavity and a second sub-cavity. One or more perforations in the first skin are fluidly coupled with the first sub-cavity. One or more perforations in the wall fluidly couple the first sub-cavity with at least a region of the second cavity.

According to another aspect of the present disclosure, another panel is provided for attenuating noise. This panel includes a first skin, a second skin, a plurality of septums and an open cavity structure, which is connected to the first skin and the second skin. The open cavity structure includes a plurality of walls configured to form a plurality of cavities vertically between the first skin and the second skin. The cavities includes a first cavity and a second cavity. The walls include a first wall laterally between and partially forming the first cavity and the second cavity. The septums are respectively disposed within the cavities. The septums include a first septum vertically between and fluidly dividing the first cavity into a first sub-cavity and a second sub-cavity. The first sub-cavity is fluidly coupled with one or more apertures in the first skin. The first sub-cavity is fluidly coupled with at least a region of the second cavity through one or more apertures in the first wall.

According to another aspect of the present disclosure, still another panel is provided for attenuating noise. This panel includes a first skin, a second skin, an open cavity structure and a plurality of septums. The open cavity structure is connected to the first skin and the second skin. The open cavity structure includes a plurality of walls configured to form a plurality of cavities that extend vertically between the first skin and the second skin. The cavities include a first cavity and a second cavity. The walls include a first wall laterally between and partially forming the first cavity and the second cavity. The septums are respectively disposed within the cavities. Each of the septums are vertically between and fluidly divide a respective one of the cavities into a first sub-cavity and a second sub-cavity. The first sub-cavity of the first cavity is fluidly coupled with one or more apertures in the first skin. The first sub-cavity of the first cavity is fluidly coupled with the second sub-cavity of the second cavity through one or more apertures in the first wall.

The panel may include a plurality of second septums respectively disposed within the cavities. Each of the second septums may fluidly divide a respective one of the cavities further into a third sub-cavity. Each of the second septums may be vertically between the second sub-cavity and the third sub-cavity. The cavities may also include a third cavity. The walls may also include a second wall laterally between and partially faulting the second cavity and the third cavity. The second sub-cavity of the second cavity may be fluidly coupled with the third sub-cavity of the third cavity though one or more apertures in the second wall.

A first of the septums may be connected to and arranged at an acute angle with the first wall.

At least the first sub-cavity of the first cavity and the second sub-cavity of the second cavity may provide a chamber adapted for attenuating noise waves.

The cellular core may be vertically between the first skin and the second skin. The wall may be laterally between and partially form the first cavity and the second cavity.

The cellular core may include a second septum fluidly dividing the second cavity into a first sub-cavity and a second sub-cavity. The one or more perforations in the wall may fluidly couple the first sub-cavity of the first cavity with the second sub-cavity of the second cavity.

The first sub-cavity of the first cavity may be vertically between the first skin and the second sub-cavity of the first cavity. The first sub-cavity of the second cavity may be vertically between the first skin and the second sub-cavity of the second cavity.

At least the first sub-cavity of the first cavity and the second sub-cavity of the second cavity may form a diagonally extending chamber within the cellular core.

The cavities may include a third cavity. The cellular core may include a second wall laterally between and partially forming the second cavity and the third cavity. One or more perforations in the second wall may fluidly couple the second sub-cavity of the second cavity with at least a region of the third cavity.

The septum may be connected to the wall. The septum may be offset from the wall by an acute angle.

The cavities may include a third cavity. The cellular core may include a second wall that partially forms and laterally fluidly divides the first cavity and the third cavity.

The cellular core may be configured as or include a honeycomb structure that includes the wall.

The cellular core may be configured as or include an open cavity structure that includes the wall.

Each of the cavities may extend from the first skin to the second skin.

The first cavity may have a polygonal cross-sectional geometry.

The cellular core may be bonded to the first skin and the second skin.

The first skin may be configured from or include composite material. The first skin may also or alternatively be configured from or include metal. The first skin may also or alternatively be configured from or include a polymer.

The cellular core may be configured from or include composite material. The cellular core may also or alternatively be configured from or include metal. The cellular core may also or alternatively be configured from or include a polymer.

The foregoing features and the operation of the invention will become more apparent in light of the following description and the accompanying drawings.

DETAILED DESCRIPTION OF THE INVENTION

Figure 1:
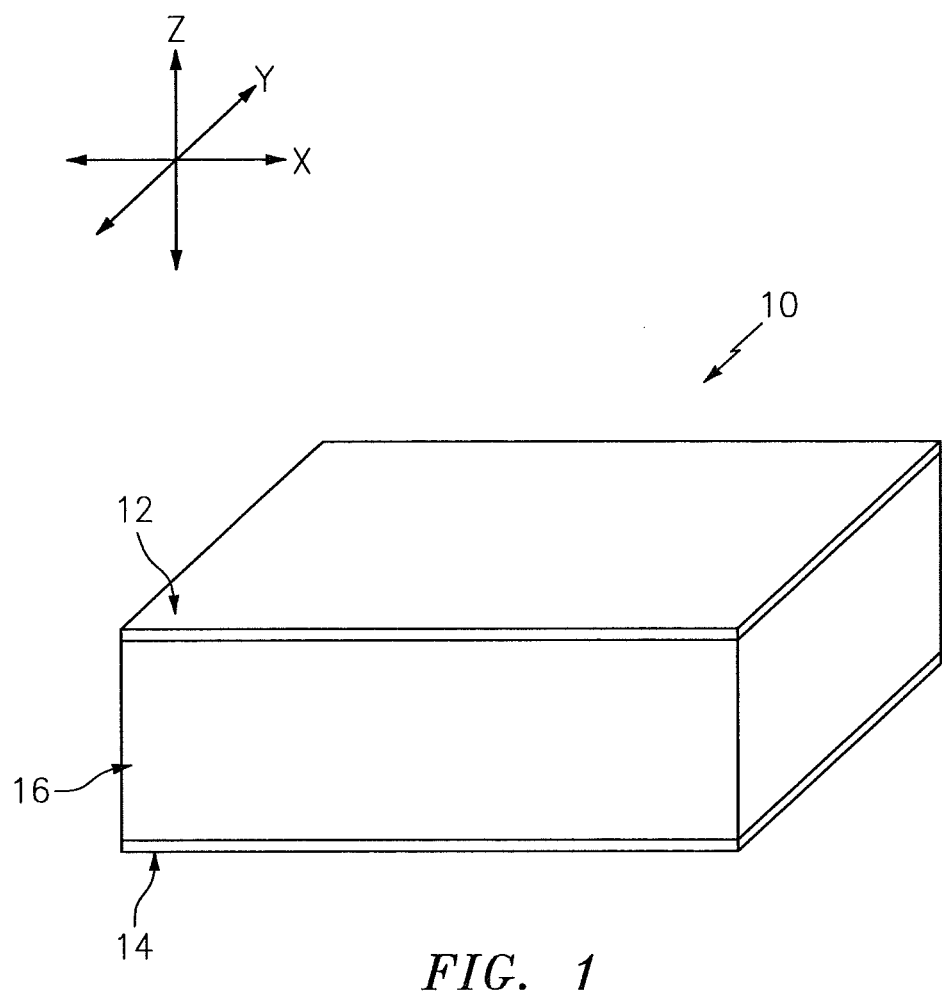
FIG. 1 is a partial, perspective block diagram illustration of a noise attenuating acoustic panel.

FIG. 1 is a partial, perspective block diagram illustration of a noise attenuating acoustic panel 10. This acoustic panel 10 may be configured to attenuate noise generated by an aircraft turbine engine propulsion system such as, for example, a turbofan propulsion system or a turbojet propulsion system. With such a configuration, the acoustic panel 10 may be configured with a nacelle or an inner fixed structure of the propulsion system. Alternatively, the acoustic panel 10 may be configured with another component/structure of the aircraft such as its fuselage or a wing. Furthermore, the acoustic panel 10 may be configured to also or alternatively attenuate aircraft related noise other than that generated by the propulsion system. The acoustic panel 10 of the present disclosure, however, may alternatively be configured for non-aircraft applications.

The acoustic panel 10 extends laterally within an x-y plane, which plane is defined by an x-axis and a y-axis. For ease of illustration, this x-y plane is shown as a generally flat plane. However, in other embodiments, the x-y plane and, thus, the acoustic panel 10 may be curved and/or follow an undulating geometry. For example, the x-y plane and, thus, the acoustic panel 10 may be arcuate, cylindrical or conical with or without radial undulations. Referring again to FIG. 1, the acoustic panel 10 extends vertically along a z-axis, which may be a radial direction in the case of a curved x-y plane. Note, the term "vertical" is used herein to describe a depthwise panel direction and is not limited to a gravitational up/down direction.

The acoustic panel 10 includes a perforated first (e.g., face) skin 12, a non-perforated second (e.g., back) skin 14 and a cellular core 16. Briefly, the cellular core 16 is disposed and extends vertically between the first skin 12 and the second skin 14. The cellular core 16 is also connected to the first skin 12 and the second skin 14. The cellular core 16, for example, may be welded, brazed, fused, adhered or otherwise bonded to the first skin 12 and/or the second skin 14. The cellular core 16 may also or alternatively be mechanically fastened to the first skin 12 and/or the second skin 14. Alternatively, the cellular core 16 may be formed integral with the first skin 12 and/or the second skin 14 as a monolithic body using, for example, additive manufacturing.

Figure 2:
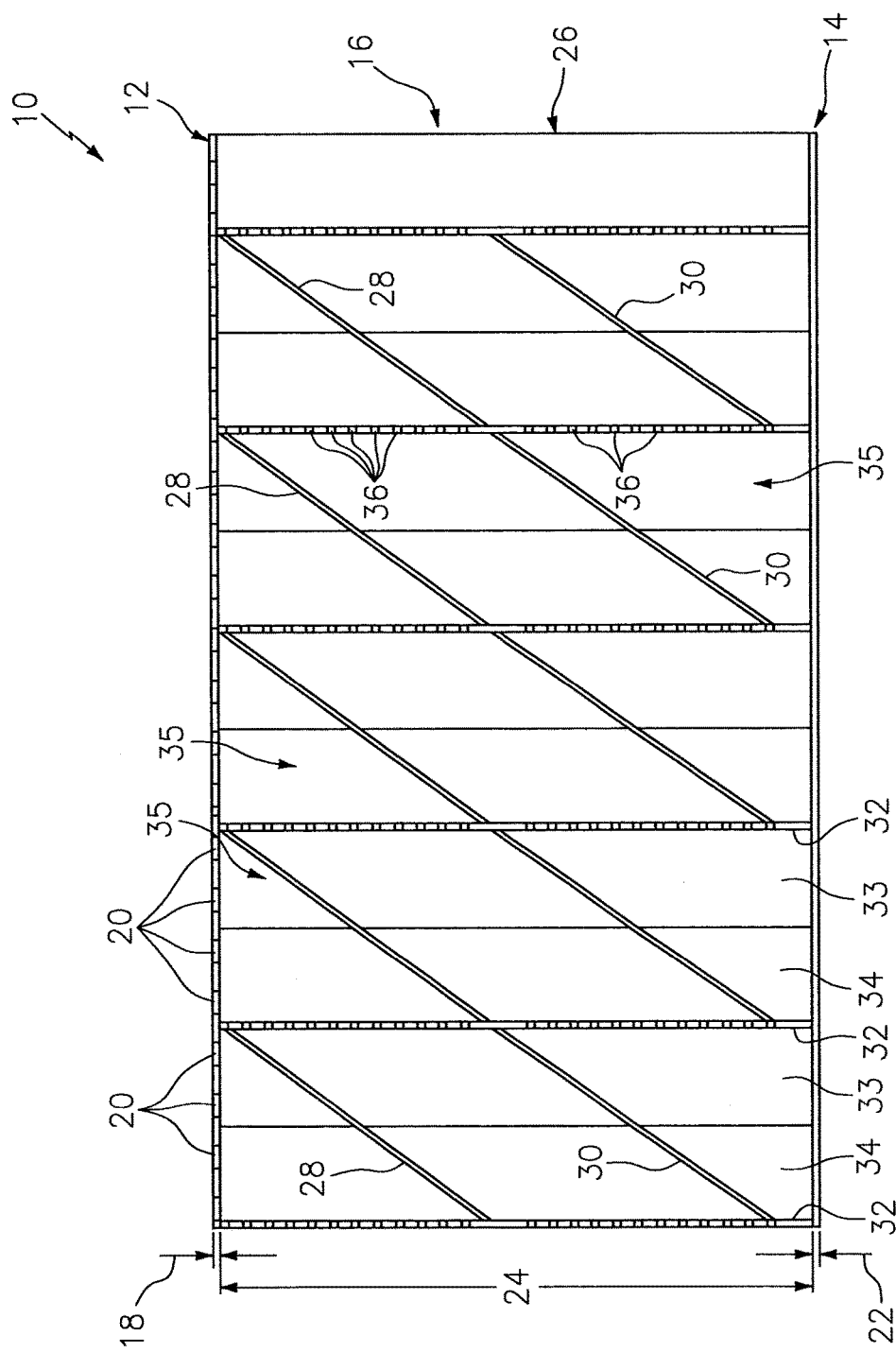
FIG. 2 is a partial, side sectional illustration of the acoustic panel.

The first skin 12 may be configured as a relatively thin sheet or layer of material that extends laterally along the x-y plane. This first skin material may include, but is not limited to, a metal, a polymer, a fiber reinforced composite (e.g., fiberglass composite, carbon fiber composite, aramid fiber composite, etc.), or a combination thereof. Referring to FIG. 2, the first skin 12 has a vertical thickness 18, which extends vertically between opposing side surfaces. The first skin 12 includes a plurality of perforations 20; e.g., apertures. Each of these perforations 20 may extend generally vertically through the first skin 12 between its side surfaces.

The second skin 14 may be configured as a relatively thin sheet or layer of (e.g., continuous and uninterrupted) material that extends laterally along the x-y plane (see FIG. 1). This second skin material may be include, but is not limited to, a metal, a polymer, a fiber reinforced composite (e.g., fiberglass composite, carbon fiber composite, aramid fiber composite, etc.), or a combination thereof. The second skin material may be the same as or different than the first skin material. The second skin 14 has a vertical thickness 22, which extends vertically between opposing side surfaces. This vertical thickness 22 may be substantially equal to or different (e.g., greater or less) than the vertical thickness 18 of the first skin 12.

The cellular core 16 extends laterally along the x-y plane (see FIG. 1). The cellular core 16 has a vertical thickness 24, which extends vertically between opposing core sides. This vertical thickness 24 may be substantially greater than the vertical thickness 18, 22 of first skin 12 and/or the second skin 14. The vertical thickness 24, for example, may be at least ten to forty times (10-40×) greater than the vertical thickness 18, 22; however, the acoustic panel 10 of the present disclosure is not limited to such an exemplary embodiment.

Figure 3:
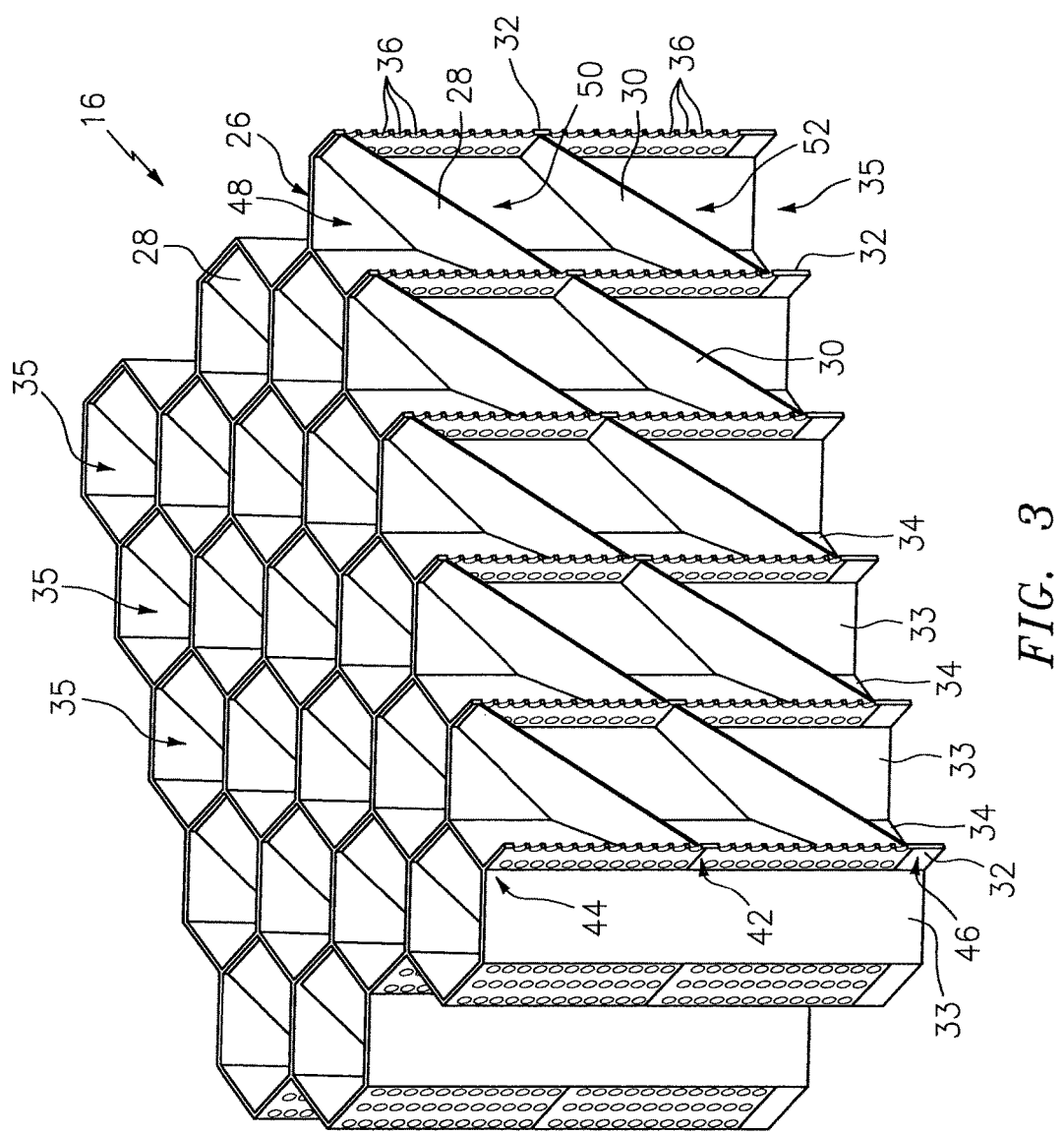
FIG. 3 is a partial perspective illustration of a cellular core for the acoustic panel.

Referring to FIGS. 2 and 3, the cellular core 16 includes an open cavity (e.g., open cell) structure 26 and a plurality of septums 28 and 30. The open cavity structure 26 includes a plurality of cavity walls 32-34. Each of these walls 32-34 may extend vertically between the first skin 12 and the second skin 14. Each of the walls 32-34 may be orientated substantially perpendicular to the first skin 12 and/or the second skin 14. However, in other embodiments, one or more of the walls 32-34 may be offset from the first and/or second skins 12 and 14 by a non-ninety degree angle; e.g., an acute included angle.

The walls 32-34 are configured together to form a plurality of cavities 35 (e.g., open cell pores) within the cellular core 16. Each of these cavities 35 may extend vertically through the open cavity structure 26 between the first skin 12 and the second skin 14 (see FIG. 2). Each of the cavities 35 may have a generally hexagonal cross-sectional geometry (when viewed in the x-y plane), thereby configuring the open cavity structure 26 as an open cell honeycomb structure. However, the open cavity structure 26 of the present disclosure is not limited to such a honeycomb structure configuration. For example, in other embodiments, one or more of the cavities 35 may each have another type of polygonal cross-sectional geometry, or a circular, oval, elliptical or amorphously curved cross-sectional geometry.

Each of the walls 32-34 is disposed laterally between and thereby partially forms a respective adjacent pair of cavities

35. The walls 32-34 of FIGS. 2 and 3 includes a plurality of perforated walls 32 and a plurality of non-perforated walls 33 and 34. The perforated walls 32 may be arranged in a plurality of linear arrays, where each array may extend in a first (e.g., x-axis) direction. A first set of the non-perforated walls 33 may be arranged in a plurality of linear arrays, where each array may extend in a second (e.g., x-axis/y-axis) direction. A second (e.g., remaining) set of the non-perforated walls 34 may be arranged in a plurality of linear arrays, where each array may extend in a third (e.g., x-axis/y-axis) direction.

Figure 4:
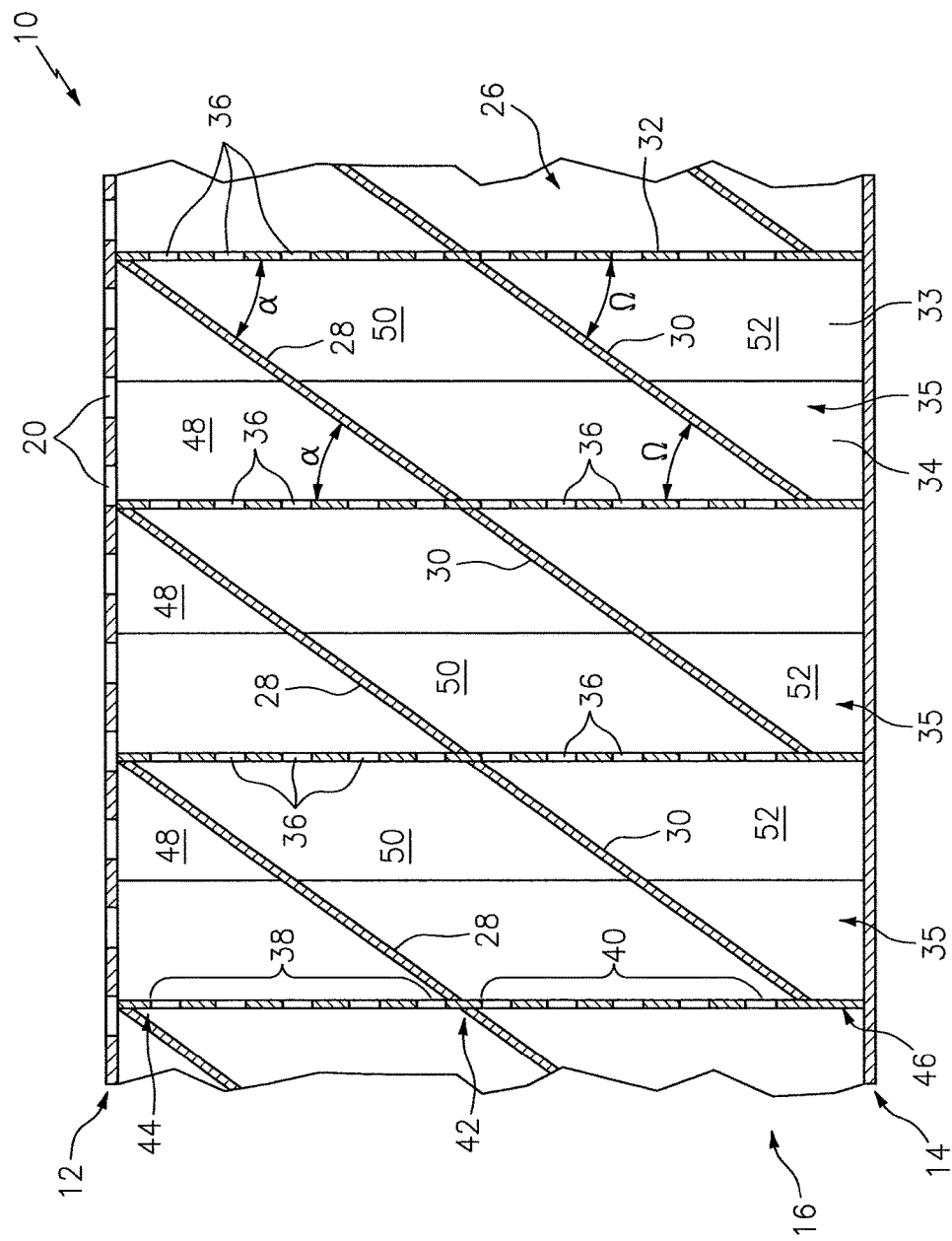
FIG. 4 is an enlarged partial, side sectional illustration of the acoustic panel.

Referring to FIGS. 2-4, each of the perforated walls 32 includes one or more perforations 36 therein. Each of these perforations 36 extends through the respective perforated wall 32 in, for example, the first (e.g., x-axis) lateral direction. The perforations 36 thereby fluidly couple the first direction laterally adjacent cavities 35 on either side of that perforated wall 32 together. The non-perforated walls 33 and 34, in contrast, do not include perforations. The second or third direction laterally adjacent cavities 35 on either side of each non-perforated wall 33, 34 therefore may be fluidly discrete (decoupled) from one another.

Referring again to the perforated walls 32 and FIG. 4, the perforations 36 in each perforated wall 32 may be arranged into one or more arrays 38 and 40; e.g., first and second arrays. The first array 38 of the perforations 36 is disposed vertically between the first skin 12 and the second array 40 of the perforations 36. These two arrays 38 and 40 of the perforations 36 may also be separated by a distance so as to provide a vertically extending non-perforated (e.g., septum mounting) region 42 therebetween. Each of the perforated walls 32 may also include one or more additional vertically extending non-perforated (e.g., septum mounting) regions 44 and 46. The second non-perforated region 44 is disposed vertically between the first skin 12 and the first array 38 of the perforations 36. The third non-perforated region 46 is disposed vertically between the second skin 14 and the second array 40 of the perforations 36.

The septums 28 and 30 may include a plurality of first septums 28 and a plurality of second septums 30. Each of the first septums 28 is disposed within a respective one of the cavities 35 and is connected to one or more of the walls 32-34 which form that cavity 35. A first end of each first septum 28, for example, may be bonded, mechanically fastened and/or otherwise attached to the second non-perforated region 44 of one of the perforated walls 32. A second end of that first septum 28 may be bonded, mechanically fastened and/or otherwise attached to the first non-perforated region 42 of another laterally neighboring one of the perforated walls 32. In this manner, each of the first septums 28 may fluidly divide a respective one of the cavities 35 into a first sub-cavity 48 and a second sub-cavity 50, where the first sub-cavity 48 is vertically between the first skin 12 and the second sub-cavity 50. Each of the first septums 28 is also offset from the perforated walls 32 at its first and second ends by an angle $\alpha$; e.g., an acute included angle.

Each of the second septums 30 is disposed within a respective one of the cavities 35 and vertically between a respective one of the first septums 28 and the second skin 14. Each of the second septums 30 is connected to one or more of the walls 32-34 which form the cavity 35 in which it is disposed. A first end of each second septum 30, for example, may be bonded, mechanically fastened and/or otherwise attached to the first non-perforated region 42 of one of the perforated walls 32. A second end of that second septum 30 may be bonded, mechanically fastened and/or otherwise attached to the third non-perforated region 46 of another laterally neighboring one of the perforated walls 32. In this manner, each of the second septums 30 may fluidly divide a respective one of the cavities 35 further into a third sub-cavity 52, where this third sub-cavity 52 is vertically between the second skin 14 and the second sub-cavity 50. Each of the second septums 30 is also offset from the perforated walls 32 at its first and second ends by an angle $\Omega$; e.g., an acute included angle. This angle $\Omega$ may be the same as the angle $\alpha$, or alternatively greater or less than the angle $\alpha$.

Figure 5:
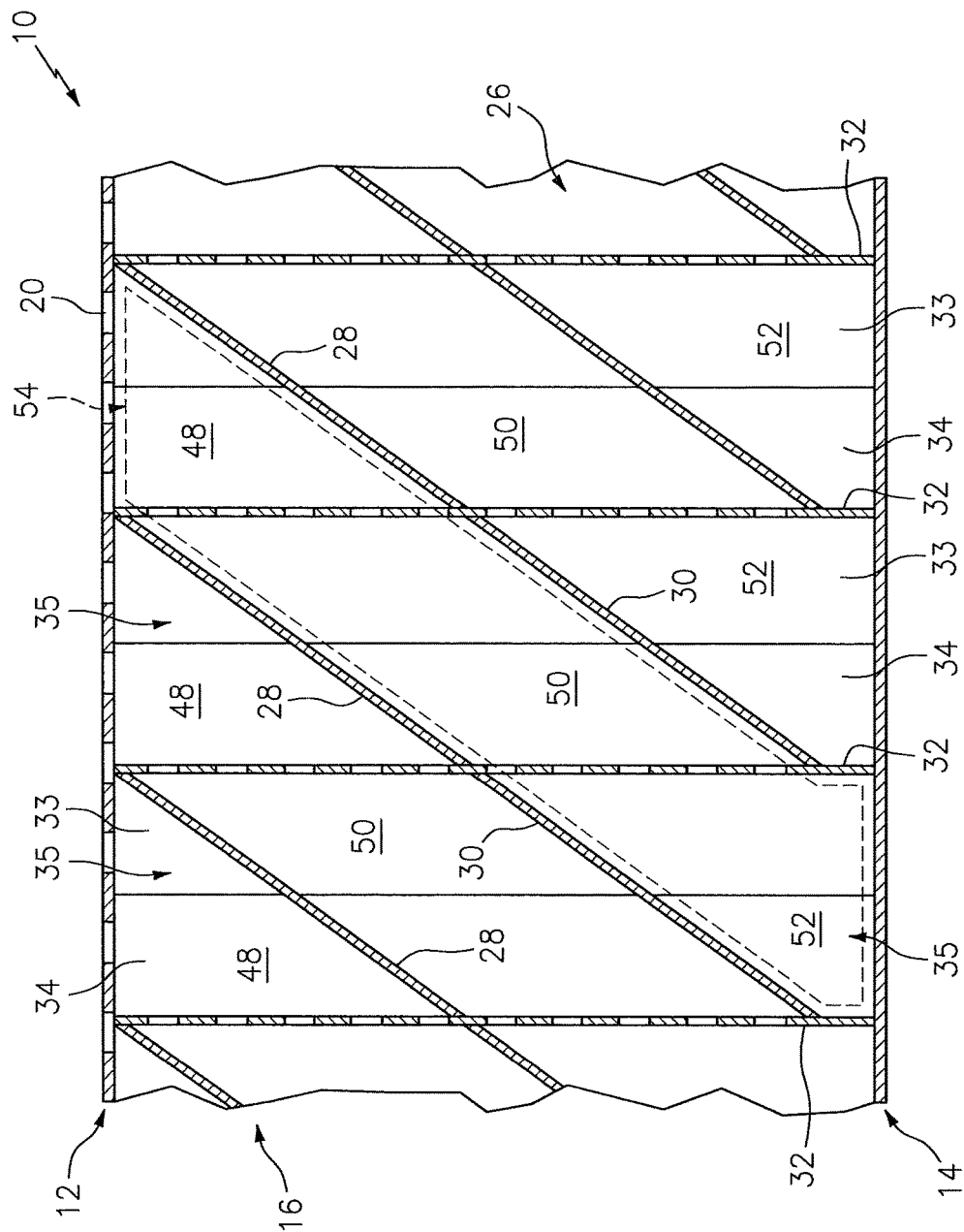
FIG. 5 is another enlarged partial, side sectional illustration of the acoustic panel.

With the foregoing septum configuration, the septums 28 and 30 are configured with the open cavity structure 26 to provide the cellular core 16 a plurality of resonance chambers 54 as illustrated in FIG. 5; e.g., triple degree of freedom resonance chambers. Each of these chambers 54 may be operable to attenuate noise waves (at one or more frequencies). For example, each chamber 54 may receive noise waves through the perforations 20 in the first skin 12. The chamber 54 may reverse the phase of one or more frequencies of those sound waves using known acoustic reflection principles and subsequently direct the reverse phase sound waves out of the acoustic panel 10 through the perforations 20 to destructively interfere with other incoming noise waves.

Each of the chambers 54 includes the first sub-cavity 48 of one of the cavities 35, the second sub-cavity 50 of another one of the cavities 35, and the third sub-cavity 52 of still another one of the cavities 35. The first sub-cavity 48 is fluidly coupled one or more of the perforations 20 in the first skin 12. The first sub-cavity 48 is fluidly coupled with the second sub-cavity 50 through the first array 38 of the perforations 36 in the perforated wall 32 between the first and the second cavities 35. The second sub-cavity 50 is fluidly coupled with the third sub-cavity 52 through the second array 40 of the perforations 36 in the perforated wall 32 between the second and the third cavities 35. By extending the chamber 54 laterally through multiple cavities 35, a length of the chamber 54 may be extended without also increasing the vertical thickness of the acoustic panel 10.

The cellular core 16 may be constructed from any suitable materials. The cellular core 16, for example, may be constructed from a metal, a polymer, a fiber reinforced composite (e.g., fiberglass composite, carbon fiber composite, aramid fiber composite, etc.), or a combination thereof. One or more of components of the cellular core 16 may be constructed from the same or a like material. Alternatively, one or more of the components of the cellular core 16 may be constructed from a different material than one or more of the other components of the cellular core 16.

In some embodiments, the first or second septums 28, 30 may be omitted from one or more of the cavities 35 to provide those cavities 35 with only two sub-cavities. In other embodiments, one or more of the cavities 35 may be configured with one or more additional septums to provide those cavities 35 with four or more sub-cavities and thereby further extend the lengths of the chambers 54.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. A panel for attenuating noise, comprising:
a first skin;
a second skin; and
a cellular core connected to and forming a plurality of cavities between the first skin and the second skin, the cellular core including a wall and a septum, the cavities including a first cavity and a second cavity, and the septum fluidly dividing the first cavity into a first sub-cavity and a second sub-cavity;
wherein a plurality of perforations in the first skin are fluidly coupled with the first sub-cavity, and a plurality of perforations in the wall fluidly couple the first sub-cavity with at least a region of the second cavity.

2. The panel of claim 1, wherein
the cellular core is vertically between the first skin and the second skin; and
the wall is laterally between and partially forms the first cavity and the second cavity.

3. The panel of claim 2, wherein
the cellular core further includes a second septum fluidly dividing the second cavity into a first sub-cavity and a second sub-cavity; and
the plurality of perforations in the wall fluidly couple the first sub-cavity of the first cavity with the second sub-cavity of the second cavity.

4. The panel of claim 3, wherein
the first sub-cavity of the first cavity is vertically between the first skin and the second sub-cavity of the first cavity; and
the first sub-cavity of the second cavity is vertically between the first skin and the second sub-cavity of the second cavity.

5. The panel of claim 3, wherein at least the first sub-cavity of the first cavity and the second sub-cavity of the second cavity form a diagonally extending chamber within the cellular core.

6. The panel of claim 3, wherein
the cavities further include a third cavity;
the cellular core further includes a second wall laterally between and partially forming the second cavity and the third cavity; and
a plurality of perforations in the second wall fluidly couple the second sub-cavity of the second cavity with at least a region of the third cavity.

7. The panel of claim 1, wherein the septum is connected to the wall, and the septum is offset from the wall by an acute angle.

8. The panel of claim 1, wherein
the cavities further include a third cavity; and
the cellular core further includes a second wall that partially forms and laterally fluidly divides the first cavity and the third cavity.

9. The panel of claim 1, wherein the cellular core comprises a honeycomb structure that includes the wall.

10. The panel of claim 1, wherein the cellular core comprises an open cavity structure that includes the wall.

11. The panel of claim 1, wherein each of the cavities extends from the first skin to the second skin.

12. The panel of claim 1, wherein the first cavity has a polygonal cross-sectional geometry.

13. The panel of claim 1, wherein the cellular core is bonded to the first skin and the second skin.

14. The panel of claim 1, wherein the first skin comprises at least one of composite material, metal or a polymer.

15. The panel of claim 1, wherein the cellular core comprises at least one of composite material, metal or a polymer.

16. A panel for attenuating noise, comprising:
a first skin;
a second skin;
an open cavity structure connected to the first skin and the second skin, the open cavity structure including a plurality of walls configured to faint a plurality of cavities that extend vertically between the first skin and the second skin, wherein the cavities include a first cavity and a second cavity, and the walls include a first wall laterally between and partially for the first cavity and the second cavity; and
a plurality of septums respectively disposed within the cavities, each of the septums vertically between and fluidly dividing a respective one of the cavities into a first sub-cavity and a second sub-cavity;
wherein the first sub-cavity of the first cavity is fluidly coupled with one or more apertures in the first skin, and fluidly coupled with the second sub-cavity of the second cavity through a plurality of apertures in the first wall.

17. The panel of claim 16, further comprising:
a plurality of second septums respectively disposed within the cavities, each of the second septums further fluidly dividing a respective one of the cavities into a third sub-cavity and vertically between the second sub-cavity and the third sub-cavity;
wherein the cavities further include a third cavity, and the walls further include a second wall laterally between and partially forming the second cavity and the third cavity; and
wherein the second sub-cavity of the second cavity is fluidly coupled with the third sub-cavity of the third cavity though a plurality of apertures in the second wall.

18. The panel of claim 16, wherein a first of the septums is connected to and arranged at an acute angle with the first wall.

19. The panel of claim 16, wherein at least the first sub-cavity of the first cavity and the second sub-cavity of the second cavity provide a chamber adapted for attenuating noise waves.

20. A panel for attenuating noise, comprising:
a first skin;
a second skin;
an open cavity structure connected to the first skin and the second skin, the open cavity structure including a plurality of walls configured to form a plurality of cavities vertically between the first skin and the second skin, wherein the cavities include a first cavity and a second cavity, and the walls include a first wall laterally between and partially forming the first cavity and the second cavity; and
a plurality of septums respectively disposed within the cavities, the septums including a first septum vertically between and fluidly dividing the first cavity into a first sub-cavity and a second sub-cavity;
wherein the first sub-cavity is fluidly coupled with one or more apertures in the first skin, and fluidly coupled with at least a region of the second cavity through a plurality of apertures in the first wall.

* * * * *

UNITED STATES PATENT AND TRADEMARK OFFICE
CERTIFICATE OF CORRECTION

PATENT NO. : 9,708,930 B2  
APPLICATION NO. : 14/964086  
DATED : July 18, 2017  
INVENTOR(S) : Christopher C. Koroly Page 1 of 1

It is certified that error appears in the above-identified patent and that said Letters Patent is hereby corrected as shown below:

In the Specification

Column 2  
Line 24, please delete "faulting" and insert --forming--

In the Claims

Column 8  
Line 11, please delete "faint" and insert --form--  
Line 15, please delete "for" and insert --forming--

Signed and Sealed this  
Twenty-ninth Day of August, 2017

Joseph Matal  
*Performing the Functions and Duties of the*  
*Under Secretary of Commerce for Intellectual Property and*  
*Director of the United States Patent and Trademark Office*